United States Patent Office 3,527,013
Patented Sept. 8, 1970

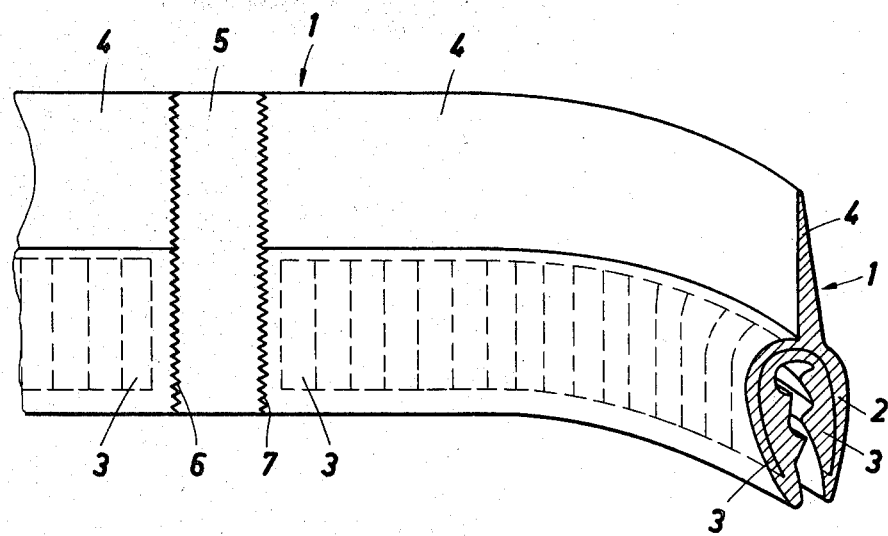

3,527,013
SEALING STRIP FOR THE EDGES OF OPENINGS OF LUGGAGE COMPARTMENTS, DOORS OR WINDOWS OF AUTOMOBILES
Werner Kruschwitz, Dusseldorf, Germany, assignor to Draftex G.m.b.H., Rhineland, Germany, a corporation of Germany
Filed Jan. 7, 1969, Ser. No. 789,505
Claims priority, application Germany, Jan. 15, 1968, D 37,367
Int. Cl. B32b 3/04; E06b 7/16
U.S. Cl. 52—716
8 Claims

ABSTRACT OF THE DISCLOSURE

A sealing strip, for luggage compartments, doors or windows of automobiles, has a portion of substantially U-shaped cross section. To compensate for tolerances, one or more short portions are interposed in the strips, which portions are made of softer material than the material of which the rest of the strips is made.

---

The invention relates to improved weather or sealing strips, particularly for sealing the edges of openings of luggage compartments, doors and windows of automobiles.

The weather strips for the edges of the openings of luggage compartments, doors or windows of automobile bodies usually consist of a rubber strip having a U-shaped cross section and are adapted to be set on a support flange. A metallic core of suitable cross section may be embedded in the sealing strip. Frequently, a sealing lip is provided on the back of the rubber strip. For reasons of workshop operation these conventional strips must be cut to lengths to fit, for example, the dimensions of the opening of the luggage compartment, prior to mounting the strips.

In practical automobile manufacture the dimensions of the openings and/or covers of the luggage compartments or of the doors or windows vary so much that the pre-cut rubber strips are sometimes too long and sometimes too short. It would consume too much time in the conventional automobile manufacturing process to shorten the strips when applying them to the support flange of the opening of the luggage compartment or of the doors or windows; lengthening of strips during the assembly phase of the manufacturing process is utterly impossible. To sort out the strips of unsuitable length from the supplied material would cause loss of material and of working time.

It is an object of the present invention to provide a weather strip for the edges of the openings of luggage compartments, doors and windows of automobiles which avoids the aforedescribed shortcomings of conventional weather strips. The strips according to the invention are made of rubber or of yielding synthetic material having, if desired, a metal core embedded therein and having substantially U-shaped cross sectional configuration for mounting on support flanges. The object of the invention is obtained by providing in the strip which is cut to the desired average length, at one or several spaced locations of its length a few millimeters long weak, ductile and compressible compensating portion wherein no metal core is embedded.

The cross section of the compensating portions set forth above has substantially the same outside dimensions as that of the rest of the strip. The compensating portions preferably consist of soft rubber or of synthetic material, as does the entire strip; however, the compensating portions have considerably thinner walls than the rest of the strip. The relatively soft rubber or synthetic material forming the compensating portions is preferably welded to the relatively hard rubber or synthetic material forming the rest of the strip. Depending on the length of the sealing strip, one or more compensating portions may be provided, the latter preferably being equally distributed over the length of the strip. It is recommended to place the compensating portions where the sealing strip rests in corners or sharp bends of the edges of the opening of the luggage compartment or the like.

The novel features which are considered characteristic of the invention are set forth with particularity in the appended claims. The invention itself, however, and additional objects and advantages thereof will best be understood from the following description of an embodiment thereof when read in connection with the accompanying drawing, the one figure of which illustrates a portion of a weather strip according to the invention.

Referring more particularly to the drawing, a weather strip 1 has a portion 2 of substantially U-shaped cross sectional configuration and is provided with a correspondingly shaped metallic insert 3. The portion 2 is set upon a support flange (not shown) and provided at the edge, for example, of the opening of a luggage compartment. The inside of the portion 2 is preferably provided with longitudinal ribs having a noselike cross section for holding the sealing strip on the support flange. At the back of the portion 2 a longitudinal sealing lip 4 is provided which is preferably integral with the portion 2.

According to the invention an intermediate portion 5 which has a compensating effect is interposed at a suitable location in the sealing strip 1. This intermediate portion is made, for example, of the same material as is the sealing strip; however, the portion 5 has a relatively thin wall. The dimensions of the outside of the profile of the intermediate portion 5 correspond to those of the strip 1. The portion 5 is welded to the portion 2 and lip 4 of the strip 1 by means of weld seams 6 and 7. The metallic insert 3 is interrupted at the compensating or intermediate portion 5 at a length corresponding at least to the width of the intermediate part 5. The metal core 3 may consist of a row of transverse ribs arranged in fishbone fashion and connected at the back part by a continuous longitudinal stem.

The compensating part 5 or a plurality of such parts make it possible to compensate the unavoidable longitudinal tolerances when mounting the sealing strips in automobiles because the sealing strips, if they are too short, are a little extended and, if they are too long are a little compressed at the compensating portion or portions.

What is claimed is:

1. A sealing strip for the edges of openings of the luggage compartment, doors or windows of an automobile, comprising a strip having a cross sectional portion of substantially U-shaped configuration and adapted to be set upon a support flange and being made of yielding material, a longitudinal metal core embedded in said strip, said core being interrupted on at least one location and said strip, at the location where said core is interrupted, being made of more ductile and compressible material than the material of which the rest of the strip is made.

2. A sealing strip as defined in claim 1 wherein the outside dimensions of the cross section of said strip at the locations where said core is interrupted are substantially the same as at the rest of the strip.

3. A sealing strip as defined in claim 1 wherein said strip at the locations where said core is interrupted is made of soft rubber.

4. A sealing strip as defined in claim 1 wherein said strip at the locations where said core is interrupted is made of soft synthetic material.

5. A sealing strip as defined in claim 1 wherein said yielding material is relatively hard rubber and said more ductile and compressible material is relatively soft rubber, said relatively soft rubber being welded to said relatively hard rubber.

6. A sealing strip as defined in claim 1 wherein said yielding material is relatively hard synthetic material and said more ductile and compressible material is relatively soft synthetic material, said relatively soft synthetic material being welded to said relatively hard synthetic material.

7. A sealing strip as defined in claim 1 wherein said core is interrupted at a plurality of locations evenly distributed over the length of the strip.

8. A sealing strip as defined in claim 1 wherein said location where said core is interrupted coincides with a bend of the support flange.

References Cited

UNITED STATES PATENTS

| | | | |
|---|---|---|---|
| 3,167,825 | 2/1965 | Zoller | 49—490 |
| 3,177,534 | 4/1965 | Millhouse et al. | 49—490 |

FOREIGN PATENTS

| | | |
|---|---|---|
| 1,457,531 | 9/1966 | France. |

FRANK L. ABBOTT, Primary Examiner

J. L. RIDGILL, JR., Assistant Examiner

U.S. Cl. X.R.

49—490; 161—99, 100